United States Patent
Kim et al.

(10) Patent No.: US 12,505,505 B2
(45) Date of Patent: Dec. 23, 2025

(54) SUPER-RESOLUTION VIDEO PROCESSING METHOD AND SYSTEM FOR EFFECTIVE VIDEO COMPRESSION

(71) Applicant: bluedot Inc., Seoul (KR)

(72) Inventors: Si-jung Kim, Seoul (KR); Joo Han Kim, Seoul (KR); Ung Won Lee, Seoul (KR); Min Yong Jeon, Seoul (KR)

(73) Assignee: BLUEDOT INC., Seoul (KR)

( * ) Notice: Subject to any disclaimer, the term of this patent is extended or adjusted under 35 U.S.C. 154(b) by 558 days.

(21) Appl. No.: 18/055,012

(22) Filed: Nov. 14, 2022

(65) Prior Publication Data

US 2024/0029202 A1 Jan. 25, 2024

(30) Foreign Application Priority Data

Jul. 20, 2022 (KR) .......................... 10-2022-0089647

(51) Int. Cl.
*G06T 3/4053* (2024.01)
*G06T 3/4046* (2024.01)

(52) U.S. Cl.
CPC .......... *G06T 3/4053* (2013.01); *G06T 3/4046* (2013.01)

(58) Field of Classification Search
CPC .............................. G06T 3/4053; G06T 3/4046
USPC .................................................... 375/240.29
See application file for complete search history.

(56) References Cited

U.S. PATENT DOCUMENTS

| 10,819,993 B2 * | 10/2020 | Park | G06N 3/084 |
| 2024/0292030 A1 * | 8/2024 | Hellier | G06V 10/82 |

FOREIGN PATENT DOCUMENTS

| JP | 2012-113513 A | 6/2012 |
| KR | 20190040586 A | 4/2019 |
| KR | 20200004427 A | 1/2020 |
| KR | 20200138079 A | 12/2020 |
| KR | 20220062575 A | 5/2022 |
| KR | 20220094342 A | 7/2022 |

OTHER PUBLICATIONS

Li, Y., et al., COMISR: Compression-Informed Video Super-Resolution, Proceedings of the IEEE/CVF International Conference on Computer Vision (ICCV), (Oct. 12, 2021).

* cited by examiner

*Primary Examiner* — Sath V Perungavoor
*Assistant Examiner* — Kristin Dobbs
(74) *Attorney, Agent, or Firm* — You & IP, LLC (57) ABSTRACT

A super-resolution video processing method and system for effective video compression can include receiving a low-resolution training video and training a neural network using a video, which is output by applying the low-resolution training video to the neural network and differentiable units included in a video encoding module, and a high-resolution training video to convert a low-resolution video into a high-resolution video.

8 Claims, 5 Drawing Sheets

SUPER-RESOLUTION VIDEO PROCESSING METHOD AND SYSTEM FOR EFFECTIVE VIDEO COMPRESSION

BACKGROUND

1. Field of the Invention

The present invention relates to a super-resolution video processing method and system for effective video compression, and more particularly, to a super-resolution video processing method and system for generating an encoding-aware super-resolution video.

2. Discussion of Related Art

Upscaling or super-resolution is a technology for generating a high-resolution video from a low-resolution video.

Due to data transmission costs and network environment constraints, media service companies compress high-resolution videos using a video codec and transmit the compressed high-resolution videos to customers through networks.

Even when a high-resolution video is generated using an artificial neural network, the related art additionally requires a process of compressing the high-resolution video using a video codec to transmit the generated high-resolution video through a network. In the additional process of compressing the high-resolution video, the high-resolution video may be damaged.

Accordingly, a method that also considers video compression based on a video codec in video super-resolution for generating a high-resolution video from a low-resolution video is necessary.

SUMMARY OF THE INVENTION

The present invention is directed to providing a super-resolution video processing method and system in which video compression is also taken into consideration when transmitting a high-resolution video through a network.

According to an aspect of the present invention, there is provided a super-resolution video processing method for effective video compression, the method including receiving a low-resolution training video and training a neural network using a video, which is output by applying the low-resolution training video to the neural network and differentiable units included in a video encoding module, and a high-resolution training video to convert a low-resolution video into a high-resolution video.

The differentiable units may include a prediction unit, a transform unit, a quantization unit, an inverse quantization unit, and an inverse transform unit.

The neural network may include a first convolution layer configured to receive the low-resolution training video and a second convolution layer configured to receive a quantization parameter.

The training of the neural network may include calculating a first loss value on the basis of a pixel-by-pixel comparison between the output video and the high-resolution training video, calculating a second loss value on the basis of a structural similarity index measure (SSIM) between the output video and the high-resolution training video, calculating a third loss value on the basis of a Euclidean distance between the output video and the high-resolution training video, and generating a loss function using the first loss value, the second loss value, and the third loss value.

The super-resolution video processing method may further include receiving quantized transform coefficients output from the quantization unit and calculating entropy.

According to another aspect of the present invention, there is provided a super-resolution video processing system for effective video compression, the system including a source device.

The source device includes a processor configured to execute instructions and a memory configured to store the instructions.

The instructions are implemented to train a neural network using a video, which is output by applying a low-resolution training video to the neural network and differentiable units included in a video encoding module, and a high-resolution training video to convert a low-resolution video into a high-resolution video.

The differentiable units may include a prediction unit, a transform unit, a quantization unit, an inverse quantization unit, and an inverse transform unit.

The instructions for training the neural network may be implemented to calculate a first loss value on the basis of a pixel-by-pixel comparison between the output video and the high-resolution training video, calculate a second loss value on the basis of an SSIM between the output video and the high-resolution training video, calculate a third loss value on the basis of a Euclidean distance between the output video and the high-resolution training video, and generate a loss function using the first loss value, the second loss value, and the third loss value.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
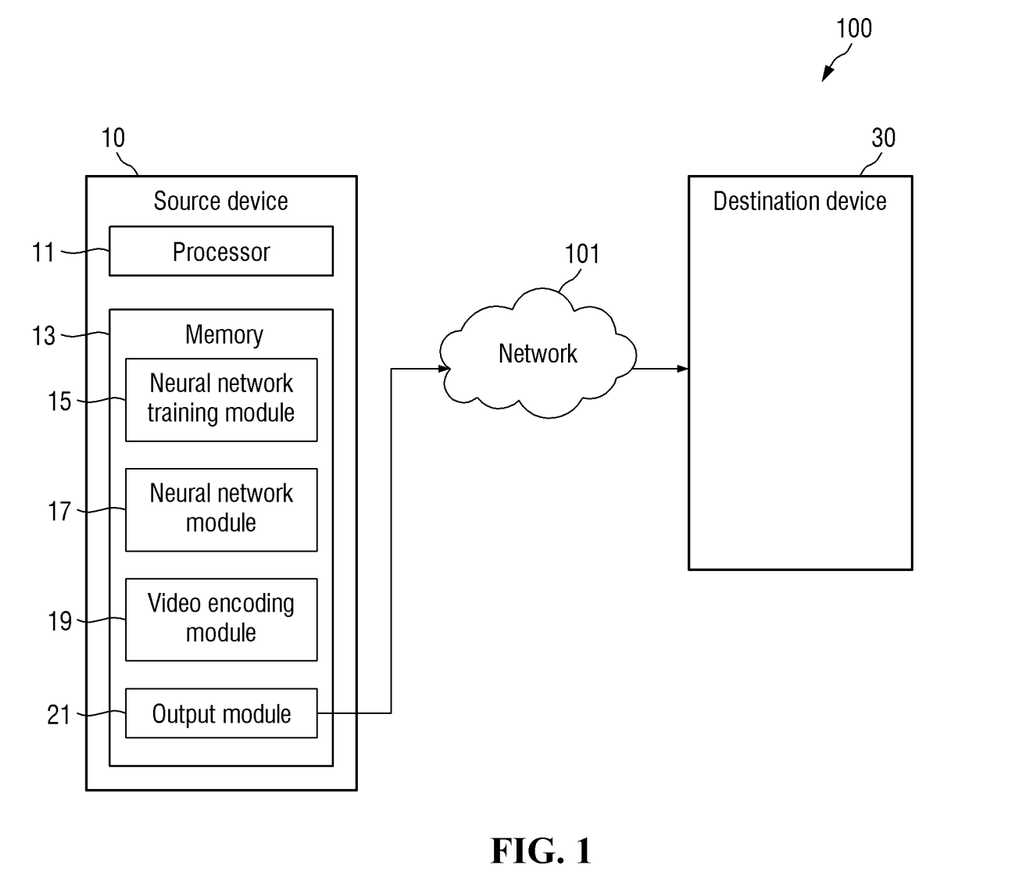
FIG. 1 is a block diagram of a super-resolution video processing system according to an exemplary embodiment of the present invention.

FIG. 1 is a block diagram of a super-resolution video processing system according to an exemplary embodiment of the present invention.

Referring to FIG. 1, a super-resolution video processing system 100 is a system that converts a low-resolution video into a high-resolution video, compresses the converted high-resolution video, and transmits the compressed high-resolution video to a user. The user is a user of a destination device 30.

The super-resolution video processing system 100 includes a source device 10 and the destination device 30.

The source device 10 and the destination device 30 may communicate with each other through a network 101. A compressed video output from the source device 10 may be transmitted to the destination device 30 through the network 101. The compressed video is an encoded video bitstream. A super-resolution video is a high-resolution video converted from a low-resolution video through a neural network.

The source device 10 may be referred to by various terms such as "video processing device," "computing device," "server," etc. The source device 10 converts a low-resolution video into a high-resolution video using a neural network and transmits a video bitstream encoded by compressing the converted high-resolution video to the destination device 30. A conversion operation from a low-resolution video into a high-resolution video may be defined as an upscaling operation. Detailed operations of the source device 10 will be described below.

The destination device 30 is an electronic device such as a laptop computer, a tablet personal computer (PC), or a desktop computer. According to an exemplary embodiment, the destination device 30 may be referred to as "client." The destination device 30 is used to receive a compressed video, that is, an encoded video bitstream. The destination device 30 receives the encoded bitstream from the source device 10, decodes the encoded bitstream, and displays the decoded bitstream on a display.

The source device 10 includes a processor 11 and a memory 13. The processor 11 executes instructions related to a super-resolution video processing method for effective video compression. The memory 13 includes the instructions for effective video compression. The memory 13 includes a neural network training module 15, a neural network module 17, a video encoding module 19, and an output module 21. The neural network training module 15, the neural network module 17, the video encoding module 19, and the output module 21 denote instructions executed by the processor 11. According to an exemplary embodiment, the video encoding module 19 and the output module 21 may be implemented in hardware. The video encoding module 19 may be referred to by various terms such as "video encoder," "encoding device," etc. Operations of the neural network training module 15, the neural network module 17, the video encoding module 19, and the output module 21 may be understood as being performed by the processor 11.

The neural network training module 15 is a module for training a neural network.

The neural network module 17 is a module for converting a low-resolution video into a high-resolution video while also considering video compression after the neural network training module 15 finishes training the neural network.

The video encoding module 19 is a module that compresses the high-resolution video output from the neural network module 17. For example, the video encoding module 19 operates in accordance with a video coding standard such as H.265.

The output module 21 is a module that transmits a bitstream output from the video encoding module 19 to the destination device 30.

Figure 2:
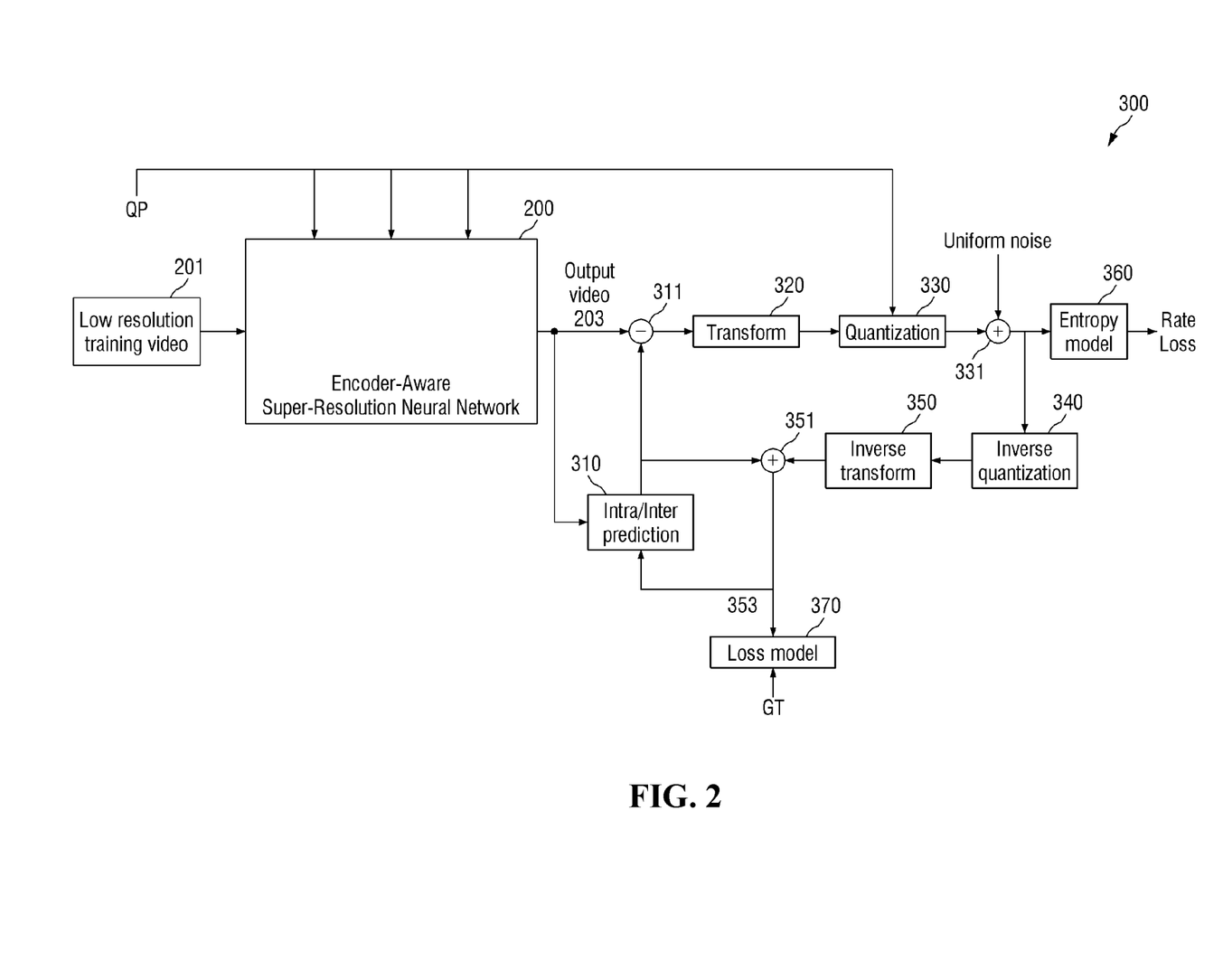
FIG. 2 is a block diagram illustrating operations of a neural network training module shown in FIG. 1.
Figure 3:
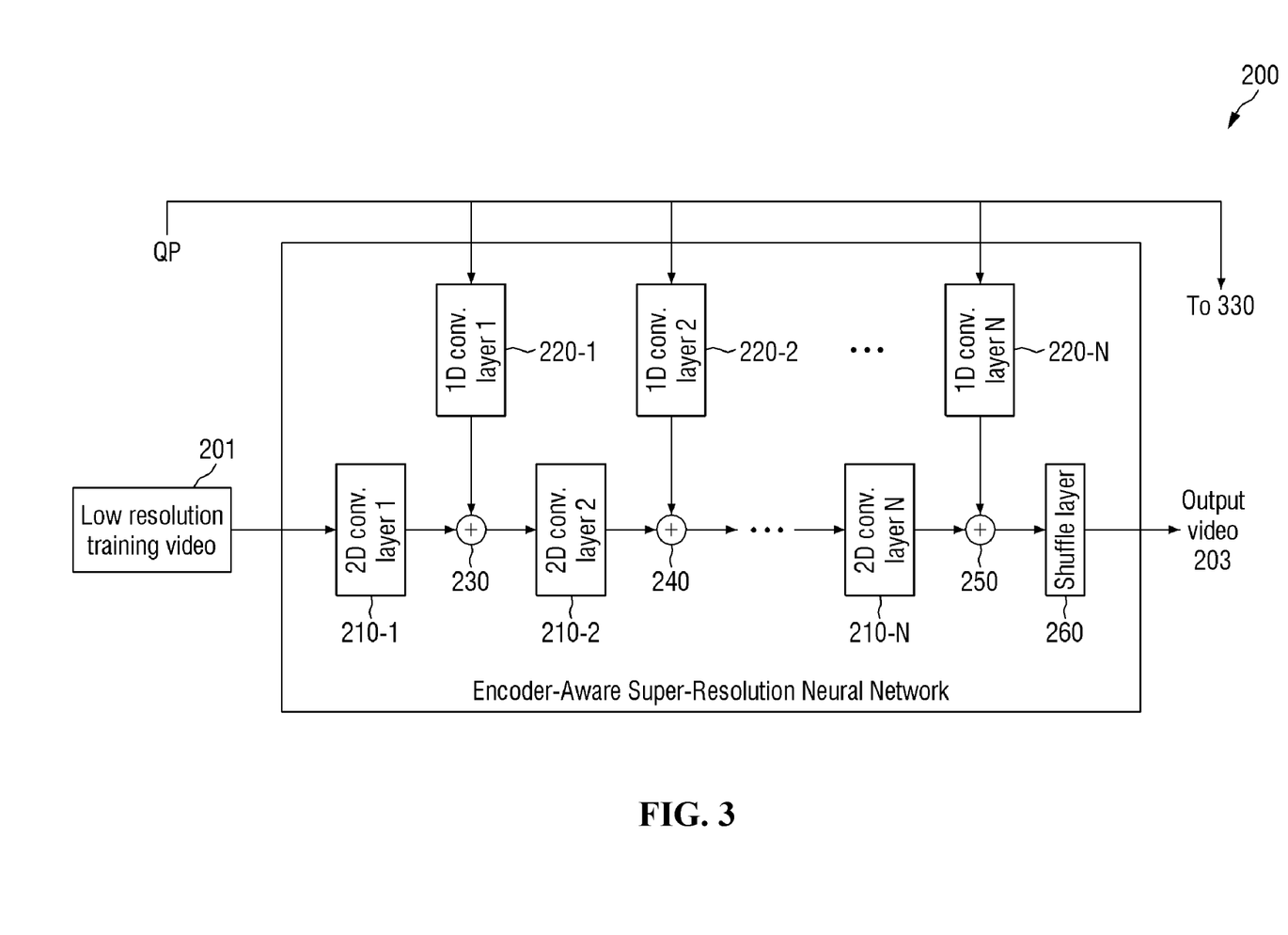
FIG. 3 is a block diagram of a neural network shown in FIG. 2.

FIG. 2 is a block diagram illustrating operations of a neural network training module shown in FIG. 1. FIG. 3 is a block diagram of a neural network shown in FIG. 2.

Referring to FIGS. 1 and 2, a reference number 300 indicates elements used for training a neural network 200. In other words, a prediction unit 310, a transform unit 320, a quantization unit 330, an inverse quantization unit 340, and an inverse transform unit 350 which may be included in the video encoding module 19 are used for training the neural network 200.

A portion of the video encoding module 19 is used for training the neural network 200.

The reason that a portion of the video encoding module 19 is used for training the neural network 200 is to prevent loss of video data caused by video compression. In other words, the neural network 200 for converting a low-resolution video into a high-resolution video while also considering video compression is trained in advance.

The neural network training module 15 receives a low-resolution training video 201 to train the neural network 200.

The neural network 200 receives the low-resolution training video 201 and generates a neural network output video 203. The neural network output video 203 is a video output from the neural network 200. The neural network output video 203 is a high-resolution video. The low-resolution training video 201 is low resolution video to train the neural network 200.

To convert a low-resolution video into a high-resolution video, the neural network training module 15 trains the neural network 200 using a video 353, which is output by applying the low-resolution training video 201 to the neural network 200 and differentiable units included in the video encoding module 19, and a high-resolution training video GT.

The differentiable units include the prediction unit 310, the transform unit 320, the quantization unit 330, the inverse quantization unit 340, and the inverse transform unit 350. Applying the low-resolution training video 201 to the neural network 200 and the differentiable units included in the video encoding module 19 involves the low-resolution training video 201 being input to the neural network 200 to output the neural network output video 203 and the neural network output video 203 being sequentially applied to the differentiable units included in the video encoding module 19 to output a video. The video output by applying the low-resolution training video 201 to the neural network 200 and the differentiable units included in the video encoding module 19 is the restored video 353.

Referring to FIG. 3, the neural network 200 is a high-resolution neural network in which the video encoding module 19 is taken into consideration. For example, the neural network 200 includes a plurality of convolution layers 210-1 to 210-N and 220-1 to 220-N (N is a natural number), a shuffle layer 260, and a plurality of adders 230, 240, and 250. According to an exemplary embodiment, the plurality of convolution layers 210-1 to 210-N and 220-1 to 220-N may vary in number.

The convolution layers 210-1 to 210-N are two-dimensional (2D) convolution layers. The convolution layer 210-1 performs a first convolution operation on a single channel of the low-resolution training video 201. The low-resolution training video 201 may be represented by a height, a width, and a channel. The low-resolution training video 201 includes a plurality of frames. The plurality of frames may be represented by a height, a width, and a channel. The horizontal and vertical sizes of the plurality of frames correspond to the width and height, respectively. The number of the plurality of frames may correspond to the number of channels. Also, the single channel of the low-resolution training video 201 may be one video frame. According to an exemplary embodiment, the single channel of the low-resolution training video 201 may be a luma channel in the YUV color space.

The first convolution operation is a convolution operation performed on one channel of the low-resolution training video 201 and a first kernel.

The convolution layers 220-1 to 220-N are one-dimensional (1D) convolution layers. The convolution layer 220-1 performs a second convolution operation on a quantization parameter QP. The quantization parameter QP controls a compression amount of a block. The quantization parameter QP having a high value represents a high compression amount and low video quality. The quantization parameter QP having a low value represents a low compression amount and high video quality. The quantization parameter QP used for training the neural network 200 may range from 18 to 42. The second convolution operation is a convolution operation performed on the quantization parameter QP and a second kernel.

The adder 230 adds a convolution value output from the convolution layer 210-1 and a convolution value output from the convolution layer 220-1. The added value is input to the convolution layer 210-2.

The convolution layer 210-2 performs a convolution operation on the value output from the adder 230 and a kernel and outputs a convolution value. Since the other layers 210-N and 220-2 to 220-N also perform similar operations, detailed description thereof will be omitted.

The shuffle layer 260 mixes tensors including a plurality of channels to generate the neural network output video 203 including one channel. The neural network output video 203 is output through the shuffle layer 260.

The neural network training module 15 applies the low-resolution training video 201 to the neural network 200 and outputs the neural network output video 203. Application to the neural network 200 represents that convolution operations are performed through the convolution layers 220-1 to 220-N.

Referring to FIG. 2, a portion of the video encoding module 19 includes the prediction unit 310, the transform unit 320, the quantization unit 330, the inverse quantization unit 340, and the inverse transform unit 350. The units are basic units for video processing. The units may be implemented in hardware or software.

To train the neural network 200, the neural network training module 15 performs operations of the prediction unit 310, the transform unit 320, the quantization unit 330, the inverse quantization unit 340, and the inverse transform unit 350 in a training operation of the neural network 200. The prediction unit 310, the transform unit 320, the quantization unit 330, the inverse quantization unit 340, and the inverse transform unit 350 are units included in the video encoding module 19. Also, operations of the inverse quantization unit 340 and the inverse transform unit 350 are performed.

Among units included in the video encoding module 19, the prediction unit 310, the transform unit 320, the quantization unit 330, the inverse quantization unit 340, and the inverse transform unit 350 are used because the prediction unit 310, the transform unit 320, the quantization unit 330, the inverse quantization unit 340, and the inverse transform unit 350 are differentiable units.

Also, to prevent damage to the high-resolution video in a high-resolution video compression process, the prediction unit 310, the transform unit 320, the quantization unit 330, the inverse quantization unit 340, and the inverse transform unit 350 which are differentiable units are used in the process of training the neural network 200.

To train the neural network 200, it is necessary for differentiation to be possible. In other words, the prediction unit 310, the transform unit 320, the quantization unit 330, the inverse quantization unit 340, and the inverse transform unit 350 are differentiable units. A filter unit (not shown) is indifferentiable among the units included in the video encoding module 19 and thus is not used for training the neural network 200.

According to an exemplary embodiment, the prediction unit 310, the transform unit 320, the quantization unit 330, the inverse quantization unit 340, and the inverse transform unit 350 perform similar operations to those of the units included in the video encoding module 19 but may not be completely the same as the units included in the video encoding module 19 to facilitate differentiation. In other words, the prediction unit 310, the transform unit 320, the quantization unit 330, the inverse quantization unit 340, and the inverse transform unit 350 shown in FIG. 2 perform similar operations to those of units used in a general video encoder. For example, the prediction unit 310 may perform an operation that is not completely the same as an operation of a prediction unit included in the video encoding module 19 but is similar thereto.

Operations of the prediction unit 310, the transform unit 320, the quantization unit 330, the inverse quantization unit 340, and the inverse transform unit 350 indicate operations for training the neural network 200 below.

The prediction unit 310 is an intra/inter prediction unit. The prediction unit 310 performs intra prediction or inter prediction to generate a prediction block.

The neural network training module 15 may divide the neural network output video 203 output from the neural network 200 into blocks. The neural network output video 203 includes a plurality of frames. The video 203 including the plurality of frames is input to the prediction unit 310.

The prediction unit 310 receives the neural network output video 203 and generates a prediction block.

A subtractor 311 subtracts the prediction block from a current block to generate a residual block. The subtractor 311 may be called "residual generation unit." The subtractor 311 uses the current block of the neural network output video 203 and the prediction block which is generated by the prediction unit 310 using the neural network output video 203.

The transform unit 320 converts the residual block into transform coefficients. The residual block is generated on the basis of the neural network output video 203.

The quantization unit 330 converts the transform coefficients into quantized transform coefficients using a quantization parameter or a quantization level. The quantized transform coefficients are generated on the basis of the neural network output video 203. The transform coefficients are divided by the quantization parameter. When the quantization parameter is set to a high value, the quantized coefficients are set to a larger number of zeros, which results in a high compression amount and low video quality. When the quantization parameter is set to a low value, the quantized coefficients are set to a larger number of values other than zero, which results in a low compression amount and high video quality.

According to an exemplary embodiment, a first adder 331 may add the quantized transform coefficients output from the quantization unit 330 and uniform noise. The quantized transform coefficients output from the quantization unit 330 are generated on the basis of the neural network output video 203.

The quantized transform coefficients that are output from the quantization unit 330 in the video encoding process rather than neural network training are generally subjected to rounding off. The rounded quantized transform coefficients are indifferentiable.

In the present invention, uniform noise is added to the quantized transform coefficients output from the quantization unit 330 for a differentiable state instead of rounding the quantized transform coefficients off.

The inverse quantization unit 340 performs inverse quantization on the transform coefficients. Inverse-quantized transform coefficients are generated on the basis of the neural network output video 203.

The inverse transform unit 350 performs an inverse transform on the inverse-quantized transform coefficients to generate a residual block. The inverse-transformed transform coefficients are generated on the basis of the neural network output video 203.

A second adder 351 restores a block using the prediction block and the residual block. The restored block is used for the prediction unit 310 to generate a prediction block. A plurality of blocks may be restored to generate the restored video 353. The second adder 351 may generate the restored video 353 using prediction blocks and residual blocks. The second adder 351 may be called "restoration unit." The restored video 353 is generated on the basis of the neural network output video 203. The second adder 351 is also a unit for performing an addition operation and may be considered a differentiable unit. The restored video 353 is generated by adding prediction blocks generated by the prediction unit 310 and residual blocks generated by the inverse transform unit 350.

A loss model 370 calculates a plurality of loss values by comparing the restored video 353 with the high-resolution training video GT. The high-resolution training video GT may be an arbitrary block in one frame. The high-resolution training video GT is ground truth.

A video that is output by applying the low-resolution training video 201 to the neural network 200 and the differentiable units (the prediction unit 310, the transform unit 320, the quantization unit 330, the inverse quantization unit 340, and the inverse transform unit 350) included in the video encoding module 19 to convert a low-resolution video into a high-resolution video is the restored video 353.

According to an exemplary embodiment, the loss model 370 calculates a plurality of loss values by comparing the restored video 353 with the high-resolution training video GT. The high-resolution training video GT may be a frame. The loss model 370 denotes program instructions for implementing a loss function. The plurality of loss values include a first loss value, a second loss value, and a third loss value. According to an exemplary embodiment, the loss model 370 may be implemented in software or hardware.

The loss model 370 calculates the first loss value on the basis of a pixel-by-pixel comparison between the restored video 353 and the high-resolution training video GT. Specifically, the first loss value may be calculated using a mean square error (MSE) between the restored video 353 and the high-resolution training video GT. The loss model 370 may calculate a pixel difference between a frame of the restored video 353 and a frame of the high-resolution training video GT.

The loss model 370 calculates the second loss value on the basis of a structural similarity index measure (SSIM) between the restored video 353 and the high-resolution training video GT. SSIM is a method for measuring the similarity between the restored video 353 and the high-resolution training video GT. The loss model 370 may calculate the SSIM between a frame of the restored video 353 and the high-resolution training video GT.

The loss model 370 calculates the third loss value on the basis of a Euclidean distance between the restored video 353 and the high-resolution training video GT. The third loss value is calculated as the Euclidean distance between the restored video 353 and the high-resolution training video GT. According to an exemplary embodiment, the third loss value may be defined as a visual geometry group (VGG) loss. The VGG loss is a type of content loss. The loss model 370 may calculate the Euclidean distance between a frame of the restored video 353 and a frame of the high-resolution training video GT.

A loss function may be generated using the first loss value, the second loss value, and the third loss value.

According to an exemplary embodiment, an entropy model 360 may be additionally used in the process of training the neural network 200.

The entropy model 360 calculates entropy of the quantized transform coefficients output from the quantization unit 330 or the added value output from the first adder 331 and outputs a rate loss. The entropy may be defined as an average number of bits required for representing a bitstream derived from the probability distribution of a random variable. Entropy is a widely known concept, and thus detailed description thereof will be omitted. The rate loss corresponds to the entropy. Also, the rate loss may be defined as a fourth loss value. The entropy model 360 denotes program instructions which are implemented so that entropy having a minimum value may be output.

$$\text{RATE} = -\log\_2(p(\text{input})) \qquad \text{[Equation 1]}$$

RATE is the rate loss or the fourth loss value. p is the entropy model 360 and represents a probability distribution of input. input is the quantized transform coefficients output from the quantization unit 330 or the added value output from the first adder 331.

When a video has a larger size and is more complicated, a larger number of bits are used. Accordingly, when a video has a larger size and is more complicated, the entropy has a higher value.

The neural network training module 15 trains the neural network 200 to minimize the fourth loss value.

When the entropy model 360 is additionally used, a loss function of the neural network 200 may be defined using the first loss value, the second loss value, the third loss value, and the fourth loss value. The loss function of the neural network 200 may be represented as Equation 2 below.

$$\text{LossFunction} = (\alpha*\text{MSE}) + (\beta*\text{SSIM}) + (\gamma*\text{VGG}) + (0.82*2^{(QP-12)/3}*\text{RATE}) \qquad \text{[Equation 2]}$$

LossFunction is the loss function, MSE is the first loss value, SSIM is the second loss value, VGG is the third loss value, and RATE is the fourth loss value. QP is a quantization parameter value. $\alpha$, $\beta$, and $\gamma$ are constants. For example, $\alpha$ may be 1.0, $\beta$ may be 10.0, and $\gamma$ may be 0.1. The values of $\alpha$, $\beta$, and $\gamma$ may be set through repeated experiments.

The neural network training module 15 trains the neural network 200 to minimize the sum of loss values of the loss function. In other words, the neural network training module 15 trains the neural network 200 to minimize the first loss value, the second loss value, and the third loss value while the fourth loss value is minimized. The fourth loss value and the first loss value, the second loss value, and the third loss value have a trade-off relationship. When the fourth loss value is reduced, the first loss value, the second loss value, and the third loss value increase. On the other hand, when the first loss value, the second loss value, and the third loss value are reduced, the fourth loss value increases.

To train the neural network 200, the low-resolution training video 201, the quantization parameter (QP), and the high-resolution training video GT are used as a training dataset for training the neural network 200.

According to an exemplary embodiment, the entropy model 360 and the loss model 370 may be implemented as one model.

Figure 4:
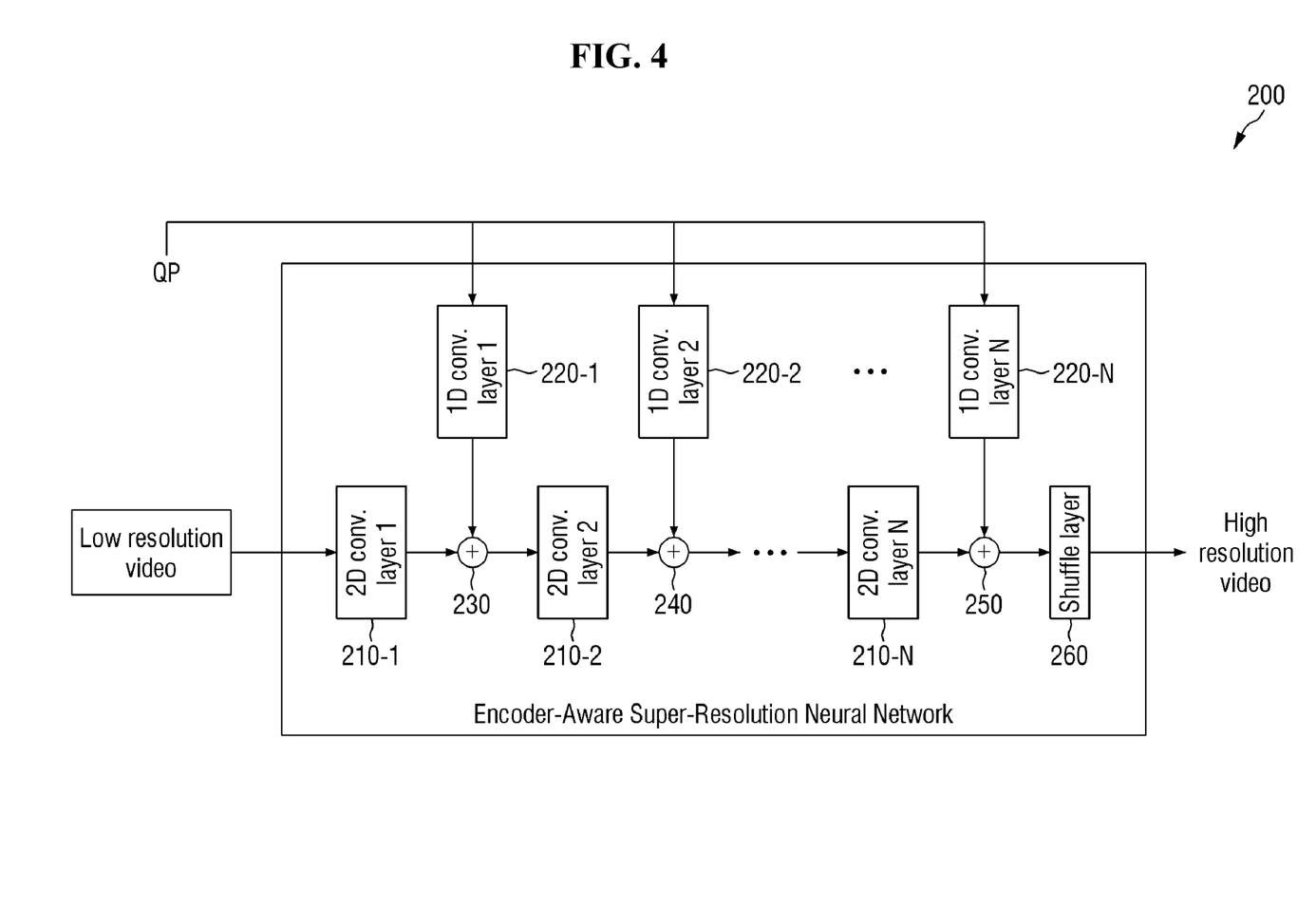
FIG. 4 is a block diagram illustrating operations of a neural network shown in FIG. 1.

FIG. 4 is a block diagram illustrating operations of a neural network shown in FIG. 1.

Referring to FIGS. 1 to 4, when training of the neural network 200 is finished, an operation of converting a low-resolution video into a high-resolution video is performed. The operation of converting a low-resolution video into a high-resolution video is performed by the neural network module 17. The neural network 200 shown in FIG. 4 is a neural network that has finished training.

In an operation of converting a low-resolution video into a high-resolution video, only the neural network 200 is used unlike what is shown in the block diagram of FIG. 2. In other words, the differentiable units included in the video encoding module 19 (i.e., the prediction unit 310, the transform unit 320, the quantization unit 330, the inverse quantization unit 340, and the inverse transform unit 350) are not used in the operation of converting a low-resolution video into a high-resolution video.

The neural network module 17 outputs a high-resolution video by applying the low-resolution video to the neural network 200. Specifically, the neural network module 17 outputs a high-resolution video having a single channel by applying one channel of the low-resolution video. The low-resolution video may be represented with a height, a width, and a channel. The single channel of the low-resolution video may be one video frame. According to an exemplary embodiment, the single channel of the low-resolution video may be a luma channel in the YUV color space.

The neural network module 17 may output a high-resolution video having a plurality of frames by accumulating video frames output from the neural network 200.

The video encoding module 19 compresses the high-resolution video output from the neural network module 17. For example, the video encoding module 19 complies with a video coding standard such as H.265.

The output module 21 transmits a bitstream output from the video encoding module 19 to the destination device 30.

Figure 5:
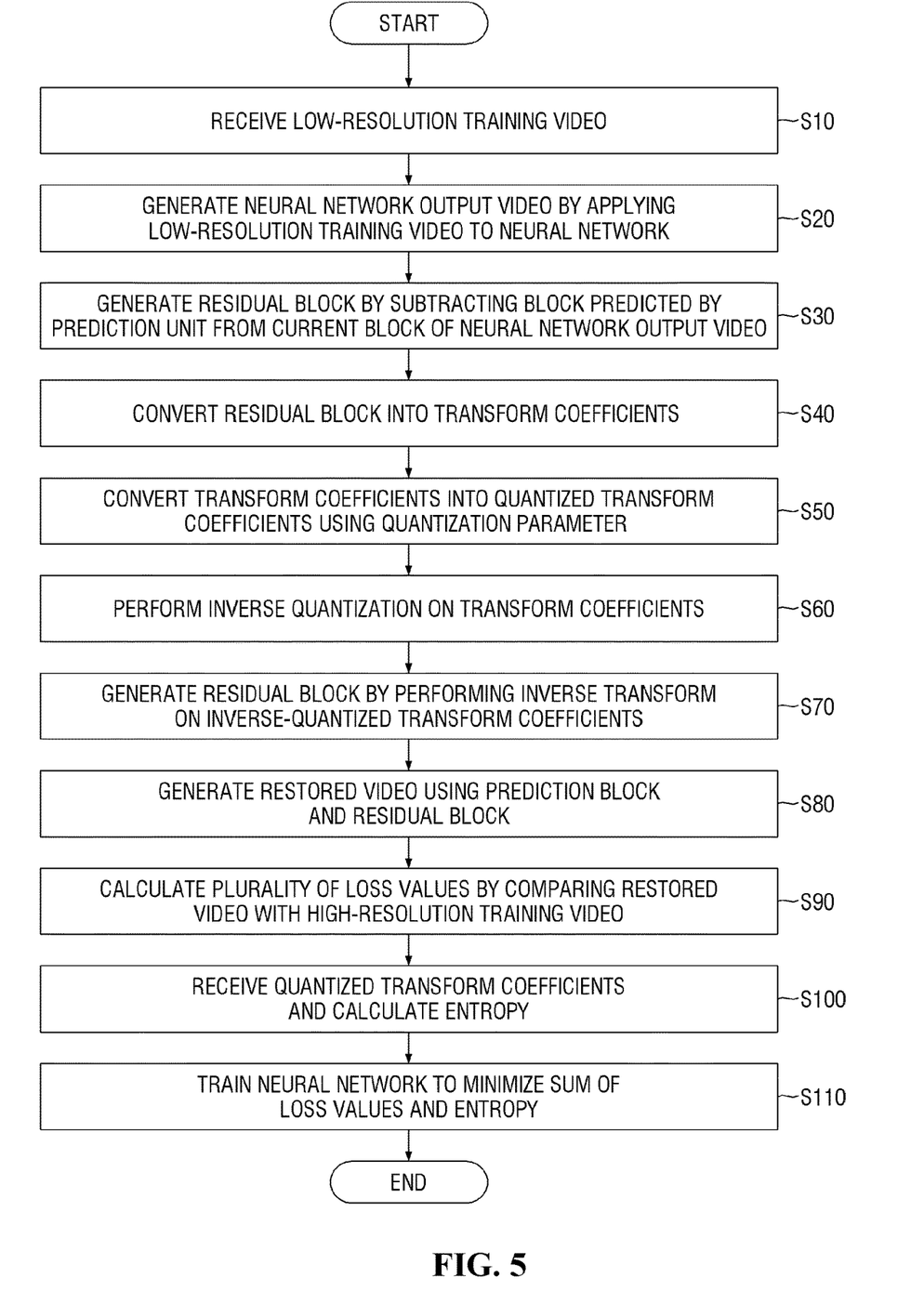
FIG. 5 is a flowchart illustrating super-resolution video processing operations according to an exemplary embodiment of the present invention.

FIG. 5 is a flowchart illustrating super-resolution video processing operations according to an exemplary embodiment of the present invention.

Referring to FIGS. 1, 3, and 5, the neural network training module 15 trains the neural network 200. Training operations for the neural network 200 will be described below.

The neural network training module 15 receives the low-resolution training video 201 to train the neural network 200 (S10).

The neural network training module 15 generates the neural network output video 203 by applying the low-resolution training video 201 to the neural network 200 (S20).

The neural network training module 15 generates a residual block by subtracting a block predicted by the prediction unit 310 from a current block of the neural network output video 203 (S30).

The neural network training module 15 converts the residual block into transform coefficients (S40). The transform unit 320 is used.

The neural network training module 15 converts the transform coefficients into quantized transform coefficients (S50). The quantization unit 330 is used.

The neural network training module 15 performs inverse quantization on the transform coefficients (S60). The inverse quantization unit 340 is used.

The neural network training module 15 generates a residual block by performing an inverse transform on the inverse-quantized transform coefficients to generate a residual block (S70). The inverse transform unit 350 is used.

The neural network training module 15 generates the restored video 353 using prediction blocks and residual blocks (S80).

The neural network training module 15 calculates a plurality of loss values by comparing the restored video 353 with a high-resolution training video (S90). The loss model 370 is used. The plurality of loss values are a first loss value, a second loss value, and a third loss value.

The neural network training module 15 receives the quantized transform coefficients and calculates entropy (S100). The entropy model 360 is used. The entropy is a fourth loss value.

The neural network training module 15 trains the neural network 200 to minimize the sum of the loss values and the entropy (S110). In other words, operations S10 to S100 are repeatedly performed to minimize the sum of the loss values and the entropy.

The operations of the neural network training module 15 are performed by the processor 11.

When training of the neural network 200 is finished by the neural network training module 15, the neural network module 17 converts a low-resolution video into a high-resolution video.

The super-resolution video processing method and system for effective video compression according to the exemplary embodiments of the present invention provide a method of training a neural network for generating a high-resolution video from a low-resolution video while also considering transmission of the high-resolution video through a network. Accordingly, it is possible to prevent loss of the high-resolution video caused in an additional process of compressing the high-resolution video.

Although the present invention has been described with reference to embodiments illustrated in the drawings, the embodiment is merely exemplary. Those of ordinary skill in the art should understand that various modifications and equivalents can be made from the embodiment. Therefore, the scope of the present invention should be determined by the technical spirit of the following claims.

What is claimed is:

1. A super-resolution video processing method for effective video compression, the super-resolution video processing method comprising:

generating a neural network output signal, wherein the neural network output signal is a high-resolution video generated by applying a low-resolution training image to a neural network;

receiving the neural network output signal to generate a prediction block, generating a residual block by subtracting the prediction block from a current block, transforming the residual block into transform coefficients, converting the transform coefficients into quantized transform coefficients, inverse-quantizing the quantized transform coefficients, and inverse-transforming the inverse-quantized transform coefficients to output the generated residual block;

generating a restored video using the prediction block and the generated residual block generated through the inverse transformation; and calculating a loss value by comparing the restored video with a high-resolution training video in order to train the neural network, wherein differentiable units include a prediction unit, a transform unit, a quantization unit, an inverse quantization unit, and an inverse transform unit, wherein the low-resolution training image and the high-resolution training image are used as a training data set for training the neural network, wherein the neural network is trained using the differentiable units in a video encoding module, wherein uniform noise is added to the quantized transform coefficients output from the quantization unit, instead of rounding off the quantized transform coefficients, such that the quantized transform coefficients are to be in a differentiable state, wherein, when the neural network outputs a high-resolution video by applying a low-resolution video to the neural network, the prediction unit, the transform unit, the quantization unit, the inverse quantization unit, and the inverse transform unit are not used.

2. The super-resolution video processing method of claim 1, wherein the neural network comprises:
a first convolution layer configured to receive the low-resolution training video; and
a second convolution layer configured to receive a quantization parameter.

3. The super-resolution video processing method of claim 1, wherein the training of the neural network comprises:
calculating a first loss value on the basis of a pixel-by-pixel comparison between the restored video and the high-resolution training video; calculating a second loss value on the basis of a structural similarity index measure (SSIM) between the restored video and the high-resolution training video; calculating a third loss value on the basis of a Euclidean distance between the restored video and the high-resolution training video; and generating a loss function using the first loss value, the second loss value, and the third loss value.

4. The super-resolution video processing method of claim 1, further comprising receiving quantized transform coefficients output from the quantization unit and calculating entropy.

5. A super-resolution video processing system for effective video compression, comprising a source device,
wherein the source device comprises:
a process configured to execute instructions; and
a memory configured to store the instructions,
wherein the instructions are implemented to generate a neural network output signal by applying a low-resolution training image to a neural network, receive the neural network output signal to generate a prediction block, generate a residual block by subtracting the prediction block from a current block, transform the residual block into transform coefficients, convert the transform coefficients into quantized transform coefficients, inverse-quantize the quantized transform coefficients, inverse-transform the inverse-quantized transform coefficients to output the generated residual block, generate a restored video using the prediction block and the generated residual block generated through the inverse transformation, and calculate a loss value by comparing the restored video with a high-resolution training image in order to train the neural network, wherein the low-resolution training image and the high-resolution training image are used as a training data set for training the neural network, wherein the neural network is trained using differentiable units in a video encoding module, wherein the differentiable units include a prediction unit, a transform unit, a quantization unit, an inverse quantization unit, and an inverse transform unit, wherein uniform noise is added to the quantized transform coefficients output from the quantization unit, instead of rounding off the quantized transform coefficients, such that the quantized transform coefficients are to be in a differentiable state, wherein, when the neural network outputs a high-resolution video by applying a low-resolution video to the neural network, the prediction unit, the transform unit, the quantization unit, the inverse quantization unit, and the inverse transform unit are not used.

6. The super-resolution video processing system of claim 5, wherein the instructions for training the neural network are implemented to:
calculate a first loss value on the basis of a pixel-by-pixel comparison between the restored video and the high-resolution training video;
calculate a second loss value on the basis of a structural similarity index measure (SSIM) between the restored video and the high-resolution training video;
calculate a third loss value on the basis of a Euclidean distance between the restored video and the high-resolution training video; and
generate a loss function using the first loss value, the second loss value, and the third loss value.

7. A source device for effective video compression comprises:
a process configured to execute instructions; and
a memory configured to store the instructions,
wherein the instructions are implemented to generate a neural network output signal by applying a low-resolution training image to a neural network, receive the neural network output signal to generate a prediction block, generate a residual block by subtracting the prediction block from a current block, transform the residual block into transform coefficients, convert the transform coefficients into quantized transform coefficients, inverse-quantize the quantized transform coefficients, inverse-transform the inverse-quantized transform coefficients to output the generated residual block, generate a restored video using the prediction block and the generated residual block generated through the inverse transformation, and calculate a loss value by comparing the restored video with a high-resolution training image in order to train the neural network, wherein the low-resolution training image and the high-resolution training image are used as a training data set for training the neural network, wherein the neural network is trained using differentiable units in a video encoding module, wherein the differentiable units include a prediction unit, a transform unit, a quantization unit, an inverse quantization unit, and an inverse transform unit, wherein uniform noise is added to the quantized transform coefficients output from the quantization unit, instead of rounding off the quantized transform coefficients, such that the quantized transform coefficients are to be in a differentiable state, wherein, when the neural network outputs a high-resolution video by applying a low-resolution video to the neural network, the prediction unit, the transform unit, the quantization unit, the inverse quantization unit, and the inverse transform unit are not used.

8. The source device of claim 7, wherein the instructions for training the neural network are implemented to:
   calculate a first loss value on the basis of a pixel-by-pixel comparison between the restored video and the high-resolution training video;
   calculate a second loss value on the basis of a structural similarity index measure (SSIM) between the restored video and the high-resolution training video;
   calculate a third loss value on the basis of a Euclidean distance between the restored video and the high-resolution training video; and
   generate a loss function using the first loss value, the second loss value, and the third loss value.

* * * * *